June 21, 1932.  E. W. SEAHOLM  1,863,885
VEHICLE HAVING BRAKES
Filed March 19, 1923  2 Sheets-Sheet 1
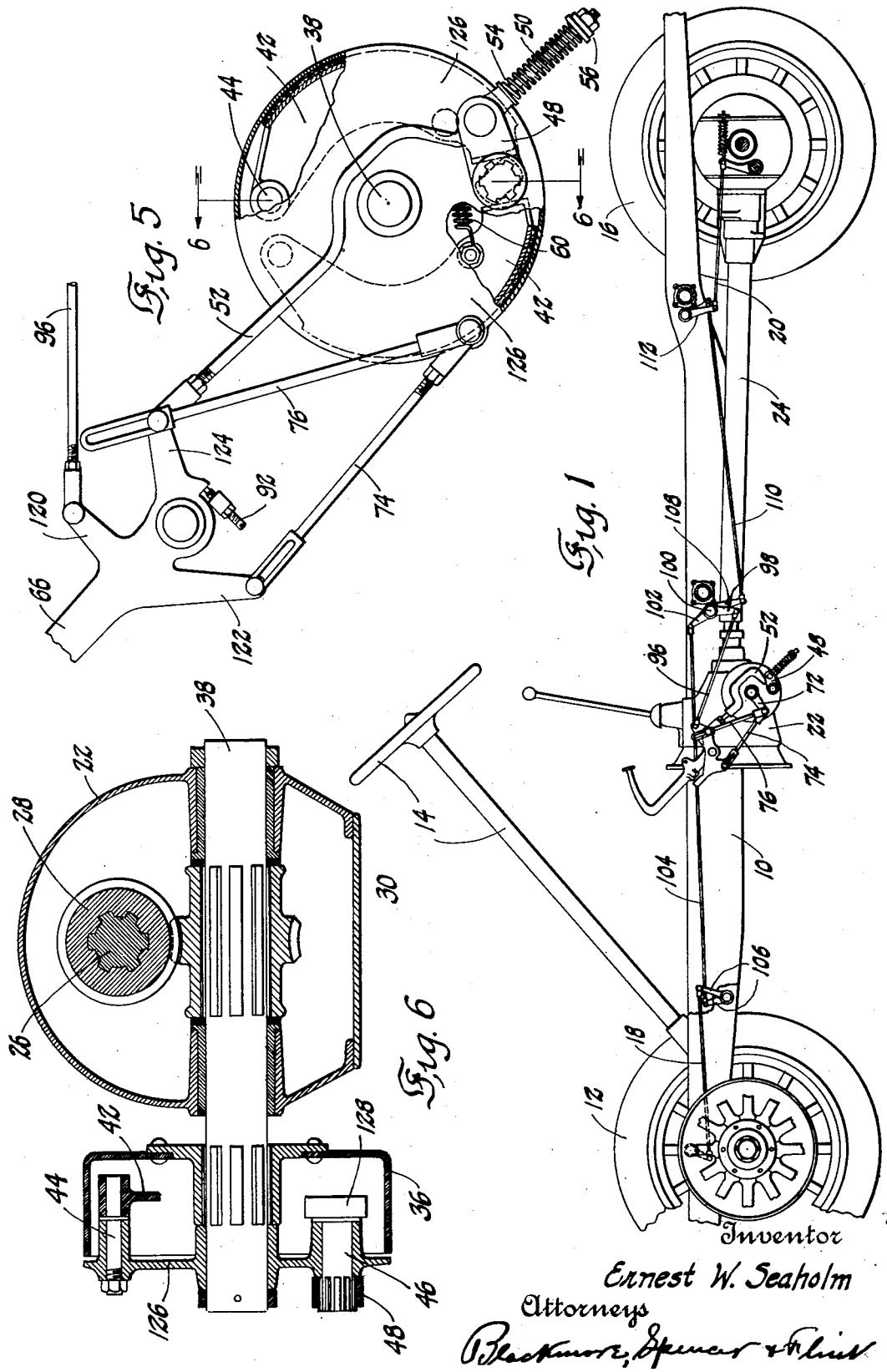
Inventor
Ernest W. Seaholm
Attorneys June 21, 1932.  E. W. SEAHOLM  1,863,885
VEHICLE HAVING BRAKES
Filed March 19, 1923   2 Sheets-Sheet 2
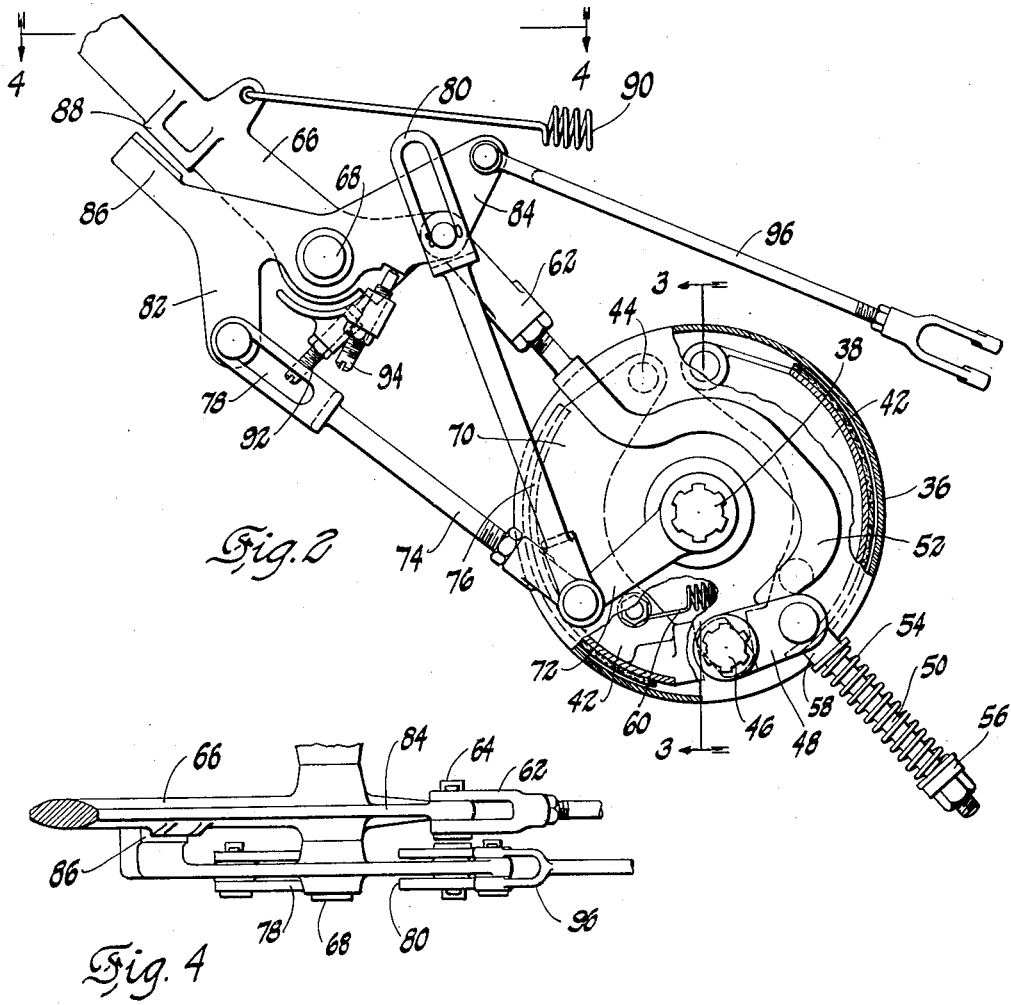
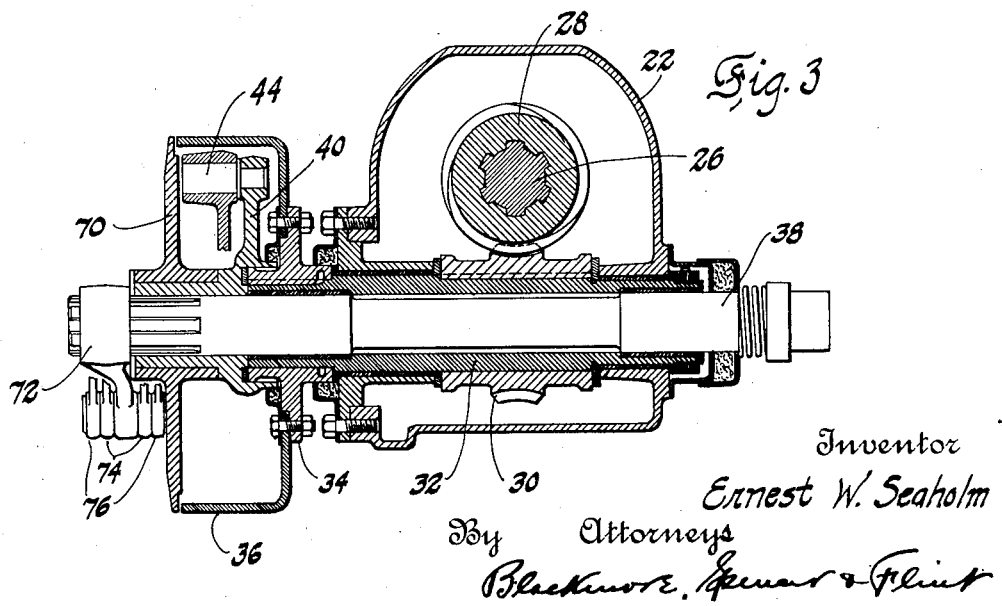
Inventor
Ernest W. Seaholm
By Attorneys
Blackmore, Spencer & Flint Patented June 21, 1932

1,863,885

UNITED STATES PATENT OFFICE

ERNEST W. SEAHOLM, OF DETROIT, MICHIGAN, ASSIGNOR TO GENERAL MOTORS CORPORATION, OF DETROIT, MICHIGAN, A CORPORATION OF DELAWARE

VEHICLE HAVING BRAKES

Application filed March 19, 1923. Serial No. 626,066.

This invention relates to vehicles having brakes of the "booster" or "servo" type and is illustrated as embodied in an automobile having four-wheel brakes arranged to be operated by a driver-controlled "booster" brake or clutch on the transmission.

An object of the invention is to provide a brake-operating mechanism of the "booster" type which will operate efficiently whether the car is moving forward or backward and which preferably is arranged for manual operation when the car is not moving. This object is attained by the use of a pair of lost-motion devices, such as links operating on oppositely-extending arms of a brake-setting lever, one of which will set the brakes when the car is going forward and the other of which will set them when the car is moving backward,—that is to say, one of the lost-motion devices is operative to set the brakes when the transmission shaft turns clockwise and the other one is operative to set the brakes when the transmission shaft turns counter-clockwise.

In the illustrative embodiments of the invention shown in the accompanying drawings, the booster mechanism includes a brake or clutch drum which is geared to the transmission shaft and a pair of brake shoes arranged to be expanded by movement of the brake pedal or equivalent controlling member, in combination with a pair of lost-motion links moved by angular movement of the shoes to operate on the oppositely-extending arms of a brake-setting lever as described. In one of these modifications which is at present preferred, this brake-setting lever has a portion in the path of movement of the brake pedal so that the brakes are set by direct manual operation when the transmission shaft is not rotating, this being distinctly preferable to an arrangement by which manual setting of the brakes takes place through the power-operated connections.

The above and other objects and features of the invention, including various novel combinations and desirable particular constructions of parts, will be apparent from the following description of the two illustrative embodiments of the invention shown in the accompanying drawings, in which:

Figure 1 is a diagrammatic view partly in side elevation and partly in longitudinal vertical section of so much of an automobile as is necessary to illustrate the invention;

Figure 2 is a view on an enlarged scale of part of the booster mechanism from the same point of view as in Figure 1, but partly broken away;

Figure 3 is a section on the line 3—3 of Figure 2 showing the manner in which the booster mechanism is operated by the transmission;

Figure 4 is a section on the line 4—4 of Figure 2 showing the various connections between the brake pedal and the transmission;

Figure 5 is a view corresponding to Figure 2 showing a modified form of the invention; and Figure 6 is a section on the line 6—6 of Figure 5 showing the manner in which the modified mechanism is operated by the transmission.

As will be apparent from Figure 1, the booster mechanism, while useful with brakes of other kinds, is especially adapted for use in an automobile having four-wheel brakes. In this figure, the chassis frame is indicated at 10 and is supported by springs (not shown) which are in turn supported by dirigible front wheels 12 controlled by a steering wheel 14 and by rear wheels 16, the front wheels being provided with brakes operated by pulling on links 18 and the rear wheels being provided with brakes operated by pulling on links 20. The car is arranged to be driven by an engine (not shown) operating through the transmission 22 to drive the rear wheels through a propeller shaft contained in a casing 24. All of these parts may be of any desired construction and are therefore shown in the accompanying drawings in conventional forms.

According to the present invention, the driving shaft 26 of transmission 22 is provided with a worm 28 meshing with a worm wheel 30 keyed to a sleeve 32 which is integral with or keyed to a flange 34 carrying a power driven brake or clutch member such as a drum 36. Thus the drum 36 is continuously rotated while the car is in motion.

A shaft 38 which is freely rotatable within the sleeve 32 is splined to a support or spider 40 which carries a pair of brake shoes 42, shown as being of the "scissors" type, pivotally mounted at 44 and arranged to be expanded into frictional engagement with drum 36 by turning a cam on a short shaft 46 which is also mounted on the spider 40. The shaft 46 is rocked to operate the cam by an arm 48 having swiveled thereto a block having a perforation for the passage of a bolt 50 carried by an irregularly shaped link 52. Link 52 rocks arm 48 through the medium of a coil spring 54, which is confined by an adjustable nut 56 threaded on bolt 50 and by a sleeve 58 which is in engagement with the block which is swiveled to arm 48. Shoes 42 are held in engagement with the cam by a spring 60 in the usual manner. Link 52, which is bent as is clearly shown in Figure 2 to avoid interference with shaft 38, is adjustably threaded into a head 62 pivotally connected to an arm extending from the brake pedal 66 shown as pivotally mounted at 68 on the transmission 22. By this arrangement, depression of pedal 66 pulls on link 52 to expand shoes 42 yieldingly through spring 54, to move them into frictional engagement with the internal surface of drum 36 so that the shoes and therefore the spider 40 and shaft 38 will tend to turn with the drum. A cover plate 70 may be provided for the outer side of the drum.

Shaft 38, which is thus operated by the power of the transmission when the brake pedal is depressed, carries an arm 72 splined on its end and which is pivotally connected to the forked ends of a pair of lost-motion links 74 and 76. The upper ends of these links are in the form of forks which are formed as shown at 78 and 80 with slots embracing pins carried by oppositely-extending arms 82 and 84 of a three arm bell-crank lever pivotally mounted beside the brake pedal at 68. This bell-crank lever has a third arm 86 arranged to be engaged by a lug 88 on the brake pedal for the purpose of setting the brakes manually when the transmission is not in operation. The brake pedal is returned to its idle position by a spring 90, this idle position being adjustably determined by a set screw 92. The idle position of the bell-crank lever is adjustably determined by engagement with a set screw 94. Set screws 92 and 94 are threaded through perforated lugs on the transmission casing.

Movement of the above described bell-crank lever is transmitted to the brakes through a link 96 connected to an arm 98 on a rock shaft 100 which operates the front brakes through a pair of arms 102, these arms being connected by links 104 to bell-crank levers 106 which in turn are connected to links 18, and which shaft 100 also operates the rear brakes through arms 108 connected by links 110 to bell-crank levers 112 which are in turn connected to links 20.

In the operation of the above described connections, and assuming that the drum 36 is turning in a clockwise direction in Figure 2, depression of the brake pedal will operate through links 52 to expand shoes 42 into frictional engagement with the drum so that the shaft 38 will also be turned in a clockwise direction. Under these circumstances lost-motion link 74 is idle, slot 78 permitting it to move relatively to arm 82 of the bell-crank lever, while the motion of the shaft is transmitted to the bell-crank lever through link 76. On the other hand if the drum is turning counterclockwise, link 76 is idle as permitted by slot 80, and the bell-crank lever is rocked in the same direction as before by a pull transmitted through link 74. In either case, that is to say whether the car is moving forward or backward, a pull is transmitted by the bell crank lever to link 96 to rock shaft 100 which operates, as will be understood, to set the brakes on all four wheels. In the normal operation of the brakes in this manner lug 88 does not come into engagement with arm 86 of the bell-crank lever, as that arm is moved out of the way by the above described movement of the bell-crank lever. If, however, the transmission is not operating, so that the above described power operation does not take place when the pedal is depressed, the bell-crank lever is rocked to set the brakes as described, by engagement of arm 86 with lug 88.

In the modification shown in Figures 5 and 6, the brake pedal 66 is provided with an arm 120 which is directly connected to the link 96 which sets the brakes and with arms 122 and 124, corresponding respectively to arms 82 and 84 in Figure 2. This arrangement may be regarded as combining the brake pedal and the bell-crank lever into a single element. This modification also differs from the modification shown in Figs. 1 to 4, in that sleeve 32 is dispensed with and drum 36 is splined directly on shaft 38 which is keyed to the worm wheel 30 so that it rotates constantly when the transmission is operating. Links 74 and 76 are pivoted directly on a support or spider 126, corresponding in some respects to the spider 40, which is rotatably mounted on shaft 30 and which carries the pivotal connections 44 of the brake shoes 42 and the shaft 46 carrying the brake cam 128.

In the operation of this modification of the invention, the drum 36 is rotated constantly by reason of its being carried by shaft 38 which is geared to the transmission shaft 26, and depression of the pedal operates through link 52 to turn cam 128 and at the same time operates directly through link 96 to set the brakes. When the shoes 42 are thus moved into frictional engagement with the drum, spider 126 is turned clockwise or counterclockwise according to the direction of rotation of shaft 38, and operates either through link 74 or link 76 to impart a further turning movement to pedal 66 to aid in setting the brakes by a "booster" or "servo" action as will be understood.

It is to be noted that in either modification the booster mechanism in effect constitutes a transmission brake by reason of the fact that the parts thereof have an angular movement which is limited by the extent of movement which can be given to the cams of the wheel brakes, so that after the wheel brakes have been set the booster mechanism reacts on the transmission as a brake. On the other hand this mechanism has some of the functions of a clutch in that it connects the transmission to the brake-operating mechanism to set the brakes by power.

While particular illustrative embodiments of my invention have been described, it is not my intention to limit its scope thereby or otherwise than by the terms of the appended claims.

I claim:

1. A vehicle having, in combination, a transmission, a brake drum driven by the transmission, expansible brake shoes within the drum, brakes, driver-controlled means for expanding said shoes to be driven from the transmission through the drum, and alternately operative devices connected to the shoes and arranged to operate the brakes whether the drum is turned by the transmission in a clockwise or counterclockwise direction.

2. A vehicle having, in combination, brakes, a transmission, a drum driven by the transmission, expansible brake shoes within the drum, a connection from said shoes arranged to operate the brakes when the shoes are turned clockwise, another connection arranged to operate the brakes when the shoes are turned counterclockwise, and driver-controlled means for expanding the shoes into engagement with the drum to set the brakes.

3. A vehicle having, in combination, road wheel brakes, a power-driven brake and clutch member, a second cooperating brake and clutch member, connections from said second member to the brakes including opposed lost-motion links one of which is operative to set the brakes when the second brake member is turned clockwise and the other of which is operative to set the brakes when said second member is turned counterclockwise, and driver-controlled means for relatively shifting said brake and clutch members to bring them into frictional engagement with one another to set the brakes.

4. A vehicle having, in combination, brakes, a power-driven brake and clutch member, a second cooperating brake and clutch member, and connections from the second member to the brakes including a lever having opposed arms and a pair of lost-motion links connecting said arms respectively to said second brake and clutch member in such a manner that the one link operates the lever to set the brakes when the brake and clutch members turn clockwise and the other link operates the lever in the same direction to set the brakes when the brake and clutch members turn counterclockwise.

5. A vehicle having, in combination, brakes, a power-driven brake and clutch member, a cooperating brake-setting brake and clutch member which is movable into frictional engagement with the power-driven member, connections for setting the brakes including a pivotally mounted lever having oppositely-extending arms, lost-motion devices operating respectively on said arms and arranged to be operated by the brake-setting member to rock the lever in the same direction whether the brake-setting member is turning clockwise or counterclockwise, and a manually-controlled device for moving the brake-setting member into frictional engagement with the power-driven member arranged to rock said pivotally mounted lever manually when the power-driven member is not in operation.

6. A vehicle having, in combination, brakes, a brake pedal, a power-driven brake and clutch member, a second cooperating brake and clutch member arranged to be moved into frictional engagement therewith by depression of the brake pedal, a bell-crank lever connected to the brakes and having oppositely-extending arms and a portion in the path of movement of the brake pedal so that depression of the brake pedal will rock the lever if said power-driven brake or clutch member is not in operation, and a pair of lost-motion devices operating respectively on said oppositely-extending arms and operated by said second brake and clutch member to set the brakes by rocking the lever in the same direction whether the power driven brake and clutch member is turning clockwise or counterclockwise.

7. A vehicle having, in combination, brakes, a brake pedal, and a linkage operated by power derived from the momentum of the moving vehicle and controlled by said pedal for setting the brakes by power, said linkage comprising a part in the path of movement of the pedal to be operated manually thereby when the linkage is not operated by power.

8. A braking system comprising a driving member rotatable in both directions of rotation by a transmission mechanism, a second member frictionally engageable therewith, manually operable means to affect such an engagement, a third member mounted for rotatable movement, a plurality of connecting means between said second member and points on said third member on opposite sides of its center of rotation, alternately operative to give said third member a uni-directional movement upon either direction of movement of said rotary member, and brakes connected to said third member.

In testimony whereof I affix my signature.

ERNEST W. SEAHOLM.